Patented Feb. 28, 1950

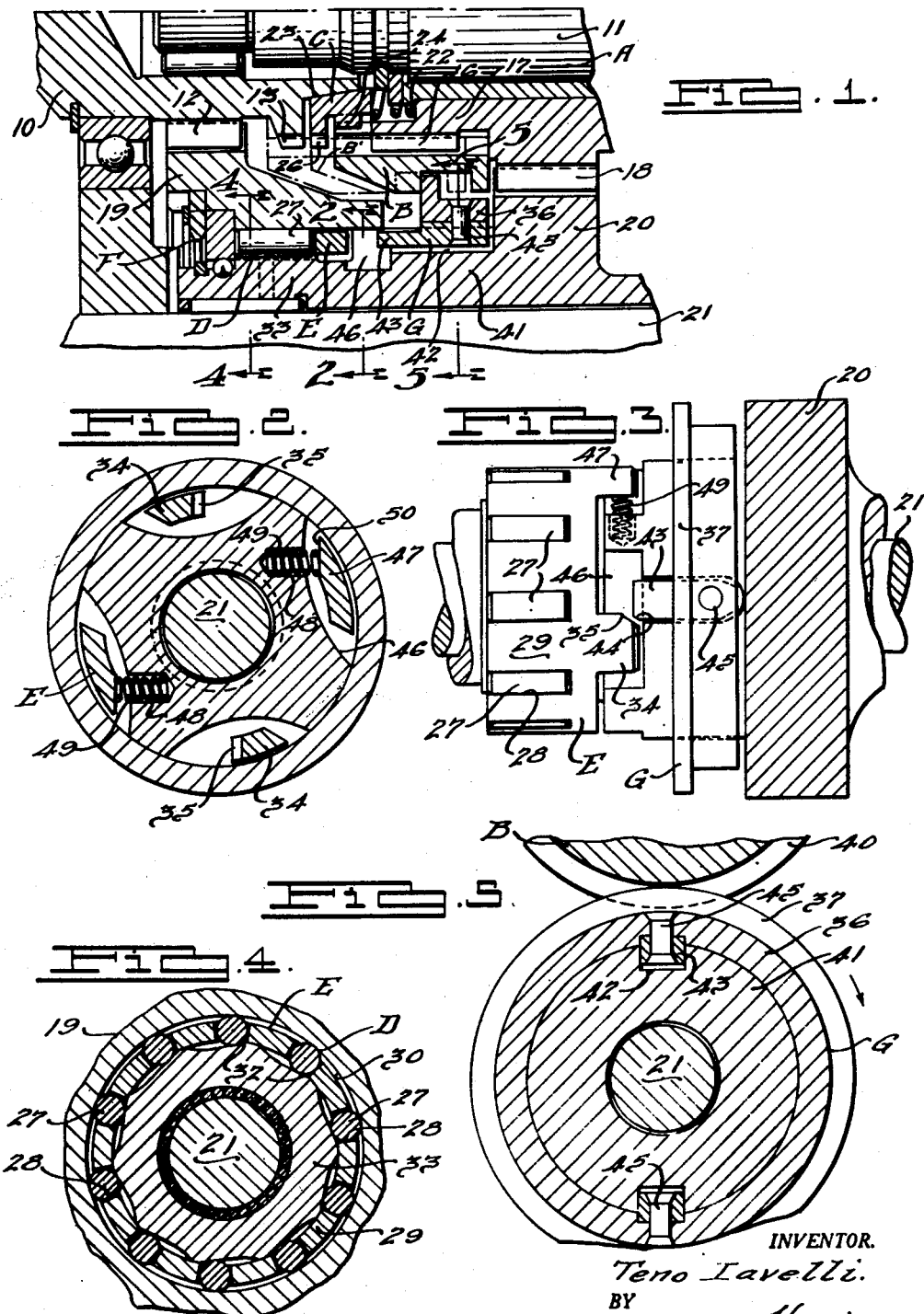

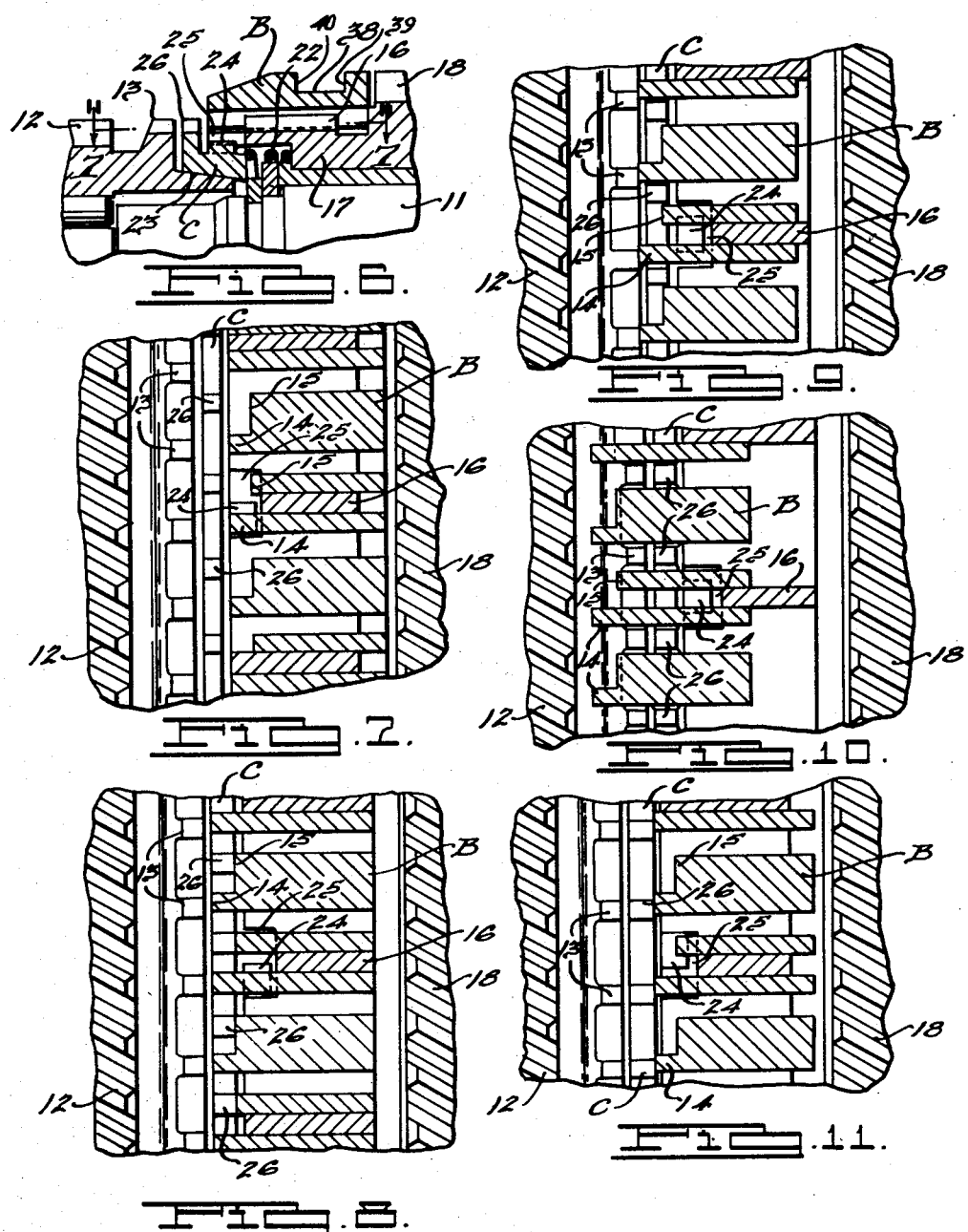

2,498,856

UNITED STATES PATENT OFFICE 2,498,856

ROLLER TYPE OVERRUNNING CLUTCH

Teno Iavelli, Detroit, Mich., assignor to Chrysler Corporation, Highland Park, Mich., a corporation of Delaware Application March 14, 1945, Serial No. 582,671

11 Claims. (Cl. 192—45)

This invention relates to power transmissions and refers more particularly to improvements in transmissions of the type adapted to transmit power from the engines to the driving wheels of motor vehicles although in its broader aspects the invention may be used to advantage wherever transmission controls of the general type illustrated are employed.

My invention is particularly directed to improvements in transmissions of the type employing an overrunning clutch and is primarily directed to improved means for rendering the overrunning clutch inoperative under certain conditions. Such general arrangements have been heretofore proposed but are not entirely satisfactory owing to tendencies for binding, excessive wear, and breakage, to occur in the control parts. Practical limitations of space and cost intensify the problems involved as the overrunning clutches are usually nested in close association with other parts and it has been a problem to provide control mechanism of a fully satisfactory character from the standpoints of function, cost, and durability.

It is an object of my invention to provide an improved transmission control which overcomes the aforesaid objections and wherein the overrunning clutch control parts are constructed and arranged for improved operation, having more direct thrust applications of the control parts, more positive action free from objectionable binding and wear of parts, and being readily adaptable within the space and cost limitations usually experienced.

Another object is to provide an overrunning clutch control embodying means for imposing an abruptly applied force or hammer-like blow on the cage such that initiation of the cage movement will be assured even though the friction drive elements or other parts tend to stick and thus resist the desired controlling movement of the cage as is sometimes experienced during cold weather operations or because of slight misalignments, wear, or other causes.

A further object is to provide an overrunning clutch control operated in improved manner by a shiftable transmission speed ratio control element so arranged that the overrunning clutch is automatically rendered inoperative or the rollers or other friction elements of the overrunning clutch held in a neutral position in response to predetermined shift of the shiftable transmission control element preferably so arranged that the shiftable element is under blocked synchronized control for obtaining the aforesaid hammer blow on the cage after the shiftable element moves in engaging direction beyond its position of initial blocking.

In carrying out the objects of my invention, I have provided a novel arrangement of cooperating camming parts on the cage and cage operating structure in association with improved biasing means for the cage and support for the cage operating structure as more particularly hereinafter described and claimed, reference being had to the accompanying drawings which are illustrative of one embodiment of my invention and in which:

Fig. 1 is a sectional elevational view showing my invention applied to a transmission change speed gearing.

Fig. 2 is a detail sectional elevational view as indicated by line 2—2 of Fig. 1.

Fig. 3 is a plan view of the overrunning clutch and cage operating structure of Fig. 1.

Fig. 4 is a detail sectional elevational view through the overrunning clutch friction elements as indicated by line 4—4 of Fig. 1.

Fig. 5 is a sectional elevational view as indicated by line 5—5 of Fig. 1.

Fig. 6 is a fragmentary sectional elevational view of the blocker clutch control as shown in Fig. 1.

Fig. 7 is a development plan view indicated by line 7—7 of Fig. 6 illustrating the clutch sleeve in fully released position and the blocker leading the sleeve.

Fig. 8 is a similar view illustrating the clutch sleeve in drive blocked position.

Fig. 9 is a similar view illustrating the clutch sleeve passing through the blocker preparatory to clutching engagement with the driving gear.

Fig. 10 is a similar view illustrating the clutch sleeve fully clutched with the driving gear.

Fig. 11 is a similar view illustrating the blocker lagging the sleeve in coast blocking relationship with respect to the sleeve.

In the drawings I have illustrated my invention as applied to a transmission of the type illustrated in the co-pending application of Carl A. Neracher et al., Serial No. 335,310, filed May 15, 1940, now Patent Number 2,455,943. I have illustrated only such portions of the disclosure in said co-pending application as may be necessary to an understanding of my invention, it being understood that my invention is of general application to a variety of types and arrangements of transmissions and drive mechanisms wherein control of overrunning clutches is desired.

A portion of the transmission is illustrated at

A and comprises an input or driving shaft 10, which receives drive from the usual engine, and an output or driven shaft 11 which is adapted to transmit drive to the vehicle ground wheels in the well known manner. The driving shaft 10 carries the driving gear or pinion 12 and a set of positive jaw-type clutch teeth 13 adapted to be interengaged with a set of jaw-type clutch teeth carried by a clutch sleeve B. The teeth of sleeve B are alternately cut back to provide relatively long teeth 14 and short teeth 15 alternate adjacent pairs being bridged together as shown in Fig. 7.

Sleeve B is slidably splined at its non-bridged teeth 14, 15 on the axially fixed teeth 16 of a hub 17 carried by the driven gear 18 which is rotatably journalled on the driven shaft 11 and adapted to be clutched thereto. The forward shift of sleeve B for clutching with teeth 13 is controlled by a blocker C whereby such clutching is limited to synchronous relationship in the speeds of rotation of gears 12 and 18 and, in the particular transmission illustrated, limited to engine coast conditions. When sleeve B is clutched with teeth 13, then the gears 12 and 18 are in two-way direct drive relationship for a 1 to 1 speed ratio drive therebetween.

Gear 18 is also adapted to be driven from gear 12 at a speed ratio different from 1 to 1 and to this end I have shown a countershaft type one-way reduction driving means between these gears. This drive comprises the coaxially rotatable countershaft gears 19 and 20 respectively in constant mesh with gears 12 and 18 and having an overrunning clutch D operably interposed therein. A stationarily mounted shaft 21 provides a journal support for the countershaft gears. Assuming the usual clockwise rotation of shaft 10, as viewed when looking from front to rear of Fig. 1, then overrunning clutch D will automatically clutch gears 19 and 20 together when gear 19 is driven counterclockwise at a speed tending to exceed that of gear 20 and automatically release the drive between these gears to allow gear 19 to freely slow down below the speed of gear 20.

As thus far described it will be apparent that with the parts arranged as in Fig. 1, drive of shaft 10 will cause the output gear 18 to be driven at a reduction drive through gears 12, 19, overrunning clutch D, and gear 20. Should the sleeve B be biased forwardly during this reduction drive, blocker C will obstruct sleeve B in an intermediate position of its shift preventing ratcheting of its teeth with teeth 13. However, if the driver releases the engine throttle control in the form of the usual accelerator pedal then, as will presently be apparent, overrunning clutch D will allow gear 12 to freely coast down relative to the sustained speed of gear 18 and when the speed of gear 12 reaches that of gear 18 blocker C will move to an unblocking position and allow sleeve B to move further forwardly to clutch with teeth 13 under synchronous conditions to provide the direct drive, clutch D continuing its overrunning operation. Upon return of sleeve B to its disengaged Fig. 1 position followed by speeding up the engine overrunning clutch D will automatically engage to restore the reduction drive.

Referring particularly to Figs. 6 to 11, blocker C is under constant bias by a spring 22 of very light compression to cause the blocker to frictionally engage the cone portion 23 of gear 12 whereby the blocker attempts to assume the speed of gear 12 within the limits allowed by a lost motion "clocking" connection with hub 17 provided by the engagement of blocker drive lug 24 in a recess 25 of hub 17. The blocker has blocking teeth 26 engageable with the teeth of sleeve B to perform the blocking function.

In Fig. 7 the sleeve B is in its initial released position of Fig. 6 and the engine is driving gear 18 through the reduction drive thus causing gear 12 to rotate faster than gear 18. Blocker C is frictionally moved to one end of recess 25, leading the sleeve B.

In Fig. 8 the sleeve is shown biased forwardly to its intermediate blocked position during the Fig. 7 condition of drive through the overrunning clutch D. Any suitable means may be provided for biasing the sleeve B as, for example, some form of servo-motor energized under vehicle speed responsive control as disclosed in said co-pending Neracher et al. application Serial No. 335,310, or the sleeve B may be biased manually. In Fig. 8 the drive lug 24 is in the position of leading the gear 18 as in Fig. 7 because gear 12 is rotating faster than gear 18. Short teeth 15 now engage the blocker teeth 26 thus blocking sleeve B against further forward movement and long teeth 14 are extended between adjacent blocker teeth 26 but there is no ratcheting of the teeth of sleeve B with teeth 13. This is the condition known as drive block of the sleeve B preparatory to clutching sleeve B with teeth 13 and may be maintained as long as desired simply by maintaining the speed of gear 12 faster than that of gear 18.

If now the driver releases the accelerator pedal then the gear 12 will begin to drop in speed and clutch D will overrun allowing gears 18 and 20 to maintain their speeds. As the speed of gear 12 falls off to approach the speed of gear 18, blocker C will be finally moved by its friction connection at 23 and Fig. 9 illustrates this condition at the time when gear 12 has dropped to substantially the speed of gear 18 causing the blocker teeth 26 to slide off the ends of the short teeth 15 whereupon the sustained forward bias on sleeve B causes pairs of the teeth 14, 15 to move forwardly between the spaces between adjacent blocker teeth 26 and finally to interengage with clutch teeth 13 as shown in Fig. 10. Thus clutching of sleeve B is effected under blocker control during engine coast from a condition of drive block, such clutching protecting the mechanism against clutching under engine torque and insuring smooth clutching.

Fig. 11 illustrates the condition of coast block from which clutching of sleeve B is prevented without first establishing the drive block condition. In Fig. 11 the sleeve B has been biased forwardly while the gear 12 is rotating at a speed less than that of gear 18. This condition may be experienced where, for example, with the accelerator pedal released for engine idling, the vehicle accelerates from rest down a hill until the vehicle speed or other controlling instrumentality effects forward bias of sleeve B. Blocker C lags gear 18, the drive lug 24 being positioned at the end of recess 25 opposite to that shown in Figs. 7 and 8. Now the long teeth 14 engage the blocker teeth 26 holding the sleeve B blocked. If now the engine is accelerated by depressing the accelerator, gear 12 speeds up and in approaching the speed of gear 18 causes blocker teeth 26 to be rotated clockwise with gear 12 so as to slide off the ends of long teeth 14. Owing to the difference in the lengths of teeth 14 and 15 and because of the rotation of gear 12 faster than gear 18, the sleeve B will not pass through the blocker teeth 26 as the ends of the short teeth 15 will engage the blocker teeth. Thus, in effect, the blocker teeth jump the gap between the long and short teeth and the parts become positioned in the Fig. 8 drive block relationship with the engine picking up the reduction drive through the overrunning clutch D. Then if the accelerator pedal is released for the coast, sleeve B will become clutched as progressively illustrated in Figs. 9 and 10 as aforesaid.

Overrunning clutch D comprises a plurality of friction drive elements of any suitable type such as the cylindrical rollers 27 held in circumferentially spaced relationship by location in the recesses 28 in the cylindrical body portion 29 of a cage E. Rollers 27 frictionally act between the internal cylindrical surface 30 of the hub 31 of gear 19 and the cams 32. These cams are formed on the hub structure 33 drivingly connected with gear 20, preferably as an extension part thereof, the hub portion 33 being disposed concentrically within the cage E. Where the helical gears 12 and 19 are so arranged as to produce forward thrust at gear 19, an assembly of thrust and gear journalling rings and retainers therefor may be provided at F between the hub portion 33 and the opening within the hollow gear 19 as shown in Fig. 1.

The cage E has its body portion 29 formed with a plurality of circumferentially spaced rearwardly projecting extensions 34 each formed with a cam face 35 formed at an angle with the common axis of rotation of gears 19 and 20. A cage operating structure G provides an operating connection between sleeve B and cage E and comprises an annular ring portion 36 formed with an outwardly extending annular flange 37 which projects into the annular shift groove 38 of sleeve B, this groove being defined between the bounding sleeve flanges or wall portions 39 and 40. The arrangement is such that a lost-motion operating connection is provided between flange 37 and the sleeve flanges 39, 40.

When the parts are positioned as in Fig. 1 the flange 37 is spaced from sleeve operating flange 39 and when the sleeve B moves forwardly to its intermediate drive block position of Fig. 8, shown in Fig. 1 by the construction line B', a substantial portion of this clearance space remains between flanges 39 and 37 so that there is no tendency to thrust the flange 37 forwardly until after the sleeve B has been unblocked and is moving forwardly for clutching with teeth 13. Furthermore this clearance space provides for a hammer-like blow from sleeve B to the cage operating structure G so as to expedite the initiation of the cage camming. This is especially beneficial in overcoming any sticking tendency at the rollers 27 and in overcoming static friction and oil drag on the parts especially in cold weather.

The ring portion 36 is slidably journalled on the hub portion 41 adjacent and drivingly connected to gear 20, this hub portion having the axially extending grooves 42 slidably receiving the thrust-transmitting projecting portions 43 of the cage operating structure G. These projections 43 extend for operation between adjacent circumferentially spaced cage projections 34 and are provided with cam faces 44 complementary and parallel to cam faces 35. A small clearance is initially provided between cam faces 35 and 44 so that, with the overrunning clutch D engaged, these faces will not engage one another and will be spaced sufficiently to maintain this relationship for normal slight wear of cams 32 and for manufacturing tolerances.

The portions 36 and 43 are shown as separate pieces secured together to form a single rigid structure by the rivets 45, such arrangement facilitating the manufacture and assembly of the cage operating structure G although, if desired, this structure may be formed as a single metal piece with the sleeve-engaged portion 37 and the cage-operating cammed portions 44.

I have provided novel biasing means for yieldingly urging the cage E rotatably in a clockwise direction, as viewed in Figs. 2 and 4, for positioning rollers 27 in clutching position. The hub portion 33 is provided with circumferentially spaced recesses 46 for receiving a cage projection 47. The hub portion 33 is also formed with circumferentially spaced spring pockets 48 respectively opening outwardly at the recesses 46 and each seating one end of a coil spring 49, the other end of which extends into a recess 46 and seats against a surface 50 normal to the axis of the associated coil spring. If desired, the projections 34 and 47 may be combined such that each cage projection has a cam face 35 and is also biased by a spring 49 as will be readily understood.

When the structure G is thrust forwardly, as by sleeve B, then the cam faces 44 cooperate with the cam faces 35 of cage E to rotatably operate the cage in the direction opposite to that effected by the biasing springs 49, thereby holding the rollers 27 away from cams 32 and maintaining the overrunning clutch D in neutral or against engaging at least insofar as the drive at cams 32 is concerned. Among other things, my invention insures against any tendency for the transmission to undesirably lock-up with a double drive and avoids an uncontrolled no-back which is sometimes experienced in the type of transmission illustrated when sleeve B fails to properly move rearwardly in bringing the car to rest on an upgrade or when the front bumper or tires place a rearward bias on the vehicle as a whole.

My invention provides an arrangement of direct thrust transmission in an improved manner from sleeve B to cage E and is capable of installation in assemblies where it is desired to maintain the gears closely adjacent each other. My arrangement of biasing springs 49 for cage E provides for an assembly of improved compactness and permits use of any desired number of springs acting directly on the cage and, if desired, the axis of these springs and recesses 48 may be inclined more in the direction of rotational bias of cage E although with the illustrated amount of offset of the springs from the cage center I have obtained the functional results desired.

In my copending divisional application Serial No. 696,703, filed September 13, 1946, now Patent Number 2,453,794, I have included claims directed to my transmission control mechanism, retaining in the subject application claims directed more particularly to my overrunning clutch mechanism.

I claim:

1. In a transmission, a rotatable driving element; a rotatable driven element coaxial with the driving element; one-way drive means operably connecting said elements comprising overrunning clutch means adapted to permit said driven element to overrun said driving element, said overrunning clutch means comprising a plurality of friction driving elements and a cage therefor; means operating through a point on said cage at a predetermined radial distance from said coaxis to rotatably bias said cage about the axis of said elements and in a direction for moving said friction elements into positions effecting one-way friction drive connection of said elements; a cage operating structure comprising a first portion thereof adapted to receive thrust for effecting shift of said cage operating structure in the direction of the axis of said elements and a second portion thereof formed with a cam face; said cage having an integral portion rotatable directly therewith and formed with a cam face adapted for engagement by the aforesaid cam face; transmission change speed means comprising an element shiftable from a first position thereof to a second position, said first portion of said cage operating structure being disposed in the path of movement of said shiftable element and spaced from said shiftable element when the latter is in its said first position such that when said shiftable element moves from its said first position to its said second position then said shiftable element will, with both an impact and motion sustaining action, strike said first portion of said cage operating structure and effect thrusting shift thereof as aforesaid thereby to cause sliding engagement of said cam faces to effect rotation of said cage relative to said cage operating structure in a direction opposite to that effected by said biasing means thereby moving said friction elements into positions for preventing establishment of said one-way drive connection, the effective tangential component of the force existing between said sliding cam faces acting at a point removed at least said predetermined radial distance from said coaxis thereby being afforded an advantageous moment arm for maximum utility of said impact and motion sustaining action in overcoming resistance such as includes the opposing torque exerted by said biasing means.

2. In a transmission, a rotatable driving element; a rotatable driven element coaxial with the driving element; one-way drive means operably connecting said elements comprising overrunning clutch means adapted to permit said driven element to overrun said driving element, said overrunning clutch means comprising a plurality of friction driving elements and a cage therefor; means operating to rotatably bias said cage about the axis of said elements and in a direction for moving said friction elements into positions effecting one-way friction drive connection of said elements; said cage comprising a cylindrical body having a plurality of axially projecting portions at either end, said portions being arranged in annuli of substantially the same mean radius as the body and being circumferentially spaced so as to define radial slots at one end and radial spaces at the other end, the radial slots at said one end receiving said friction driving elements and the portions at said other end presenting bias abutment means whereby said biasing means may cooperatingly transmit its thrust to the cage and friction driving elements; a cage operating structure comprising a first portion thereof adapted to receive thrust for effecting shift of said cage operating structure in the direction of the axis of said elements and a second portion thereof formed with a plurality of projections respectively adapted for movement into said radial spaces between said cage projections; the projections of said cage and cage operating structure having coacting cam faces so constructed and arranged that, when said cage operating structure is shifted as aforesaid, said cage will be rotated relative to said cage operating structure in a direction opposite to that effected by said biasing means thereby moving said friction elements into positions for preventing establishment of said one-way drive connection.

3. In a transmission, a rotatable driving element; a rotatable driven element coaxial with the driving element; one-way drive means operably connecting said elements comprising overrunning clutch means adapted to permit said driven element to overrun said driving element, said overrunning clutch means comprising a plurality of friction driving elements and a cage therefor; said cage comprising a cylindrical body having a plurality of axially projecting portions at either end thereof, said portions being arranged in annuli of substantially the same mean radius as said body and being circumferentially spaced such that a certain lateral face of any projection and the opposed lateral face of the circumferentially next projection defines an intervening radial gap; said one-way drive means further comprising a rotatable hub structure drivingly connected with said driven element and having a portion thereof disposed concentrically within said cage and forming a bottom for each radial gap; biasing means comprising a plurality of compression springs spaced from each other about the axis of said elements and so disposed that one end of each spring is seated on the bottom forming portion of said hub structure and the other end of each spring thrusts on said certain lateral face of an individual one of said projections so as to rotatably bias said cage about the axis of said elements in a direction for moving said friction elements into positions effecting one-way friction drive connection of said elements; a cage operating structure comprising a first portion thereof adapted to receive thrust for effecting shift of said cage operating structure in the direction of the axis of said elements and a second portion thereof formed with a cam face; said opposed lateral face of at least one of said projections having an area presenting a cam face adapted for engagement by the aforesaid cam face; and means for shifting said cage operating structure as aforesaid to cause the cam face of said cage operating structure to slidably engage the cam face of said cage to effect rotation of said cage relative to said cage operating structure in a direction opposite to that effected by said biasing means thereby moving said friction elements into positions for preventing establishment of said one-way drive connection.

4. In a transmission according to claim 3, said rotatable hub structure having a second portion thereof disposed concentrically within said cage operating structure and providing an axially splined support for slidably mounting said cage operating structure, said first named portion of the hub structure being of a girth such as permits free axial passage slidably thereover by the cage operating structure member and passage thereonto by the cage member, and having thrust means removably associated with an end thereof and preventing reverse passage thereof by said members.

5. In a transmission, a rotatable driving element; a rotatable driven element coaxial with the driving element; one-way drive means operably connecting said elements comprising overrunning clutch means adapted to permit said driven element to overrun said driving element, said overrunning clutch means comprising a plurality of friction driving elements and a cage therefor; said drive means further comprising a rotatable hub structure drivingly associated with said driven element and formed with circumferentially spaced recesses; said cage having a plurality of projections respectively extending into said recesses; biasing means comprising a plurality of coil springs spaced from each other about the axis of said elements and so disposed that one end of each spring is seated on said hub structure and the other end extends into one of said recesses in thrusting relationship with one of said cage projections thereby to rotatably bias said cage about the axis of said elements in a direction for moving said friction elements into positions effecting one-way friction drive connection of said elements; a cage operating structure comprising a first portion thereof adapted to receive thrust for effecting shift of said cage operating structure in the direction of the axis of said elements and a second portion thereof formed with a cam face; said cage having a cam face adapted for engagement by the aforesaid cam face, said cam faces being so constructed and arranged that, when said cage operating structure is shifted as aforesaid, said cage will be rotated relative to said cage operating structure in a direction opposite to that effected by said biasing means thereby moving said friction elements into positions for preventing establishment of said one-way drive connection.

6. In an overrunning clutch control, coaxially rotatable driving and driven gears, said driven gear having a hub portion formed with a guideway, overrunning clutch elements between said hub portion and said driving gear operable to connect said gears for a one-way drive, a cage for said clutch elements having an integral projection rotatable therewith and having a cam face of the same mean radius from said coaxis as the interposed clutch elements, means biasing said cage in one direction of rotation tending to position said clutch elements so as to effect said operable connection, a thrust member slidably fitted to said guideway and having a portion cammed for slidably acting on said cammed projection whereby, in response to sliding of the thrust member in said guideway, said cage is cammed rotatably in a direction opposite to that aforesaid, the working surfaces of the camming members having their effective contacting area substantially in longitudinal alignment with and in axial spacing to the interposed clutch elements.

7. In an overrunning clutch control according to claim 6, an annular collar surrounding said hub portion adjacent said driven gear for imparting thrust to said thrust member, and means structurally connecting said collar and thrust member together.

8. In a transmission, a rotatable driving element; a rotatable driven element coaxial with the driving element; one-way drive means operably connecting said elements comprising overrunning clutch means adapted to permit said driven element to overrun said driving element, said overrunning clutch means comprising a plurality of friction driving elements and a cage therefor; said drive means further comprising a rotatable hub structure drivingly associated with said driven element and formed with circumferentially spaced recesses; said cage having a plurality of projections respectively extending into said recesses; biasing means comprising a plurality of coil springs spaced from each other about the axis of said elements and so disposed that each spring seats on said hub structure and extends in a common transverse plane angularly outward into one of said recesses for bearing radially oblique upon one of said cage projections thereby to rotatably bias said cage about the axis of said elements in a direction for moving said friction elements into positions effecting one-way friction drive connection of said elements, said coil springs occupying a limited toroidal zone within said rotatable driving element; a cage operating structure comprising a first portion thereof adapted to receive thrust for effecting shift of said cage operating structure in the direction of the axis of said elements and a second portion thereof formed with a cam face; said cage having a cam face adapted for engagement by the aforesaid cam face, said cam faces being so disposed as to lie on the peripheral fringes of and extend radially outside of said toroidal zone thereby being afforded both a greater effective moment arm around said coaxis and a tangentially normal line of force application in the torquewise regard to said coil spring thrust, and being so constructed and arranged that, when said cage operating structure is shifted as aforesaid, said cage will be rotated relative to said cage operating structure such as favorably to overcome any resisting thrusts as contributed to by said biasing means thereby moving said friction elements in an opposite direction into positions for preventing establishment of said one-way drive connection.

9. In a transmission, a rotatable driving element; a rotatable driven element coaxial with the driving element; one-way drive means operably connecting said elements comprising overrunning clutch means adapted to permit said driven element to overrun said driving element, said overrunning clutch means comprising a plurality of friction driving elements and a cage therefor; said cage comprising a cylindrical body having a plurality of axially projecting portions at either end thereof, said portions being arranged in annuli of substantially the same mean radius as said body and being circumferentially spaced such that a certain lateral face of any projection and the opposed lateral face of the circumferentially next projection defines an intervening radial gap; said one-way drive means further comprising a rotatable hub structure drivingly connected with said driven element and having a portion thereof disposed concentrically within said cage and forming a bottom for each radial gap; biasing means comprising a plurality of compression springs spaced from each other about the axis of said elements and so disposed that one end of each spring is seated on the bottom forming portion of said hub structure and the other end of each spring thrusts on said certain lateral face of an individual one of said projections so as to rotatably bias said cage about the axis of said elements in a direction for moving said friction elements into positions effecting one-way friction drive connection of said elements; a cage operating structure comprising a first portion thereof adapted to receive thrust for effecting shift of said cage operating structure in the direction of the axis of said elements and a second portion thereof formed with a cam face; said opposed lateral face of at least one of said projections having an area presenting a cam face adapted for engagement by the aforesaid cam face; the spring thrust effect and the camming effect being limited as to their direct field of action to the projection containing annulus at one axial end of said cage exclusively, the radial gaps at the other axial end being devoted to the confinement of the friction driving elements individually; and means for shifting said cage operating structure as aforesaid to cause the cam face of said cage operating structure to slidably engage the cam face of said cage to effect rotation of said cage relative to said cage operating structure in a direction opposite to that effected by said biasing means thereby moving said friction elements into positions for preventing establishment of said one-way drive connection.

10. In an overrunning clutch control the combination with coaxially rotatable driving and driven gears, a rotatable hub structure drivingly associated with said driven gear and formed with circumferentially spaced depressed faces along a first and second portion and a guideway along a third portion; overrunning clutch elements between said hub portion and said driving gear operable to connect said gears for a one-way drive; a cage for said clutch elements comprising a cylindrical body having a plurality of axially projecting portions at either end thereof, said portions defining intervening and circumferentially spaced radial gaps which at one end of the cylindrical body match respectively with the depressed faces of said first hub portion and at the other end with the depressed faces of said second hub portion, said faces thereby affording a depressed chamber floor for each cavity as defined by the individual gaps; and means biasing said cage in one direction of rotation tending to position said clutch elements so as to effect said operable connection; said cage being so constructed as to have a cam face formed on at least one of said projections adjacent said second hub portion; of a thrust member slidably fitted to said guideway and having a portion cammed for slidably acting on said cammed projection whereby, in response to sliding of the thrust member in said guideway, said cage is cammed rotatably in a direction opposite to that aforesaid, said clutch elements occupying the individual cavities extending radially outward from the depressed floors of the first hub portion.

11. In an overrunning clutch control the combination with coaxially rotatable driving and driven gears, a rotatable hub structure drivingly associated with said driven gear and formed with circumferentially spaced depressed faces along a first and second portion and a guideway along a third portion; overrunning clutch elements between said hub portion and said driving gear operable to connect said gears for a one-way drive; a cage for said clutch elements comprising a cylindrical body having a plurality of axially projecting portions at either end thereof, said portions defining intervening and circumferentially spaced radial gaps which at one end of the cylindrical body match respectively with the depressed faces of said first hub portion and at the other end with the depressed faces of said second hub portion, said faces thereby affording a depressed chamber floor for each cavity as defined by the individual gaps; and means biasing said cage in one direction of rotation tending to position said clutch elements so as to effect said operable connection; said cage being so constructed as to have a cam face formed on at least one of said projections adjacent said second hub portion; of a thrust member slidably fitted to said guideway and having a portion cammed for slidably acting on said cammed projection whereby, in response to sliding of the thrust member in said guideway, said cage is cammed rotatably in a direction opposite to that aforesaid, said clutch elements occupying the individual cavities extending radially outward from the depressed floors of the first hub portion, said biasing means and thrust member portion being arranged to contribute to the cavity occupation adjunct to the second hub portion; an annular collar surrounding said hub portion adjacent said driven gear for imparting thrust to said thrust member, and means structurally connecting said collar and thrust member together.

TENO IAVELLI.

REFERENCES CITED

The following references are of record in the file of this patent:

UNITED STATES PATENTS

| Number | Name | Date |
| --- | --- | --- |
| 838,024 | Hendricks | Dec. 11, 1906 |
| 1,726,329 | Aiken | Aug. 27, 1929 |
| 1,782,605 | Farley | Nov. 25, 1930 |
| 2,001,668 | Maier | May 14, 1935 |
| 2,068,773 | Slider | Jan. 26, 1937 |
| 2,077,253 | Nardone | Apr. 13, 1937 |
| 2,299,739 | Colucci | Oct. 27, 1942 |
| 2,309,864 | Patterson | Feb. 2, 1943 |
| 2,369,848 | Patterson | Feb. 20, 1945 |